July 1, 1924.
W. H. SMITH
HANDLE
Filed Aug. 6, 1923
1,500,011
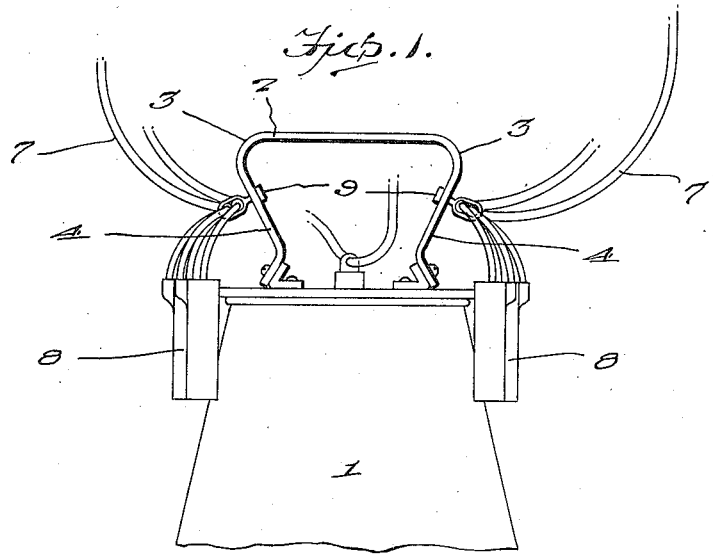
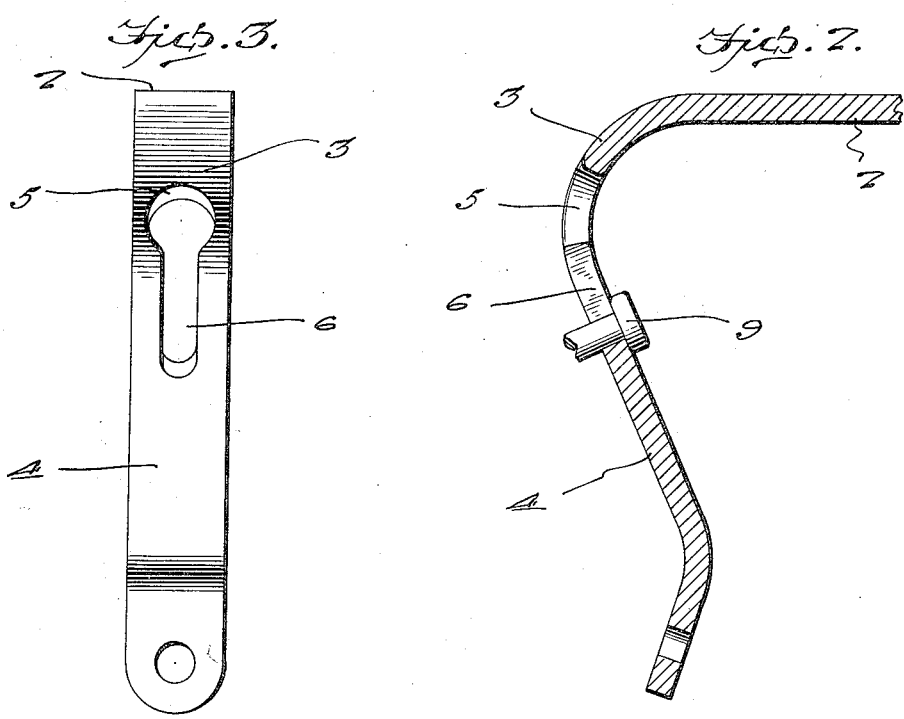
Wm. H. Smith
INVENTOR
BY Victor J. Evans
ATTORNEY
WITNESS:

Patented July 1, 1924.

1,500,011

UNITED STATES PATENT OFFICE.

WILLIAM H. SMITH, OF LAVALLE, WISCONSIN.

HANDLE.

Application filed August 6, 1923. Serial No. 655,975.

*To all whom it may concern:*

Be it known that I, WILLIAM H. SMITH, a citizen of the United States, residing at Lavalle, in the county of Sauk and State of Wisconsin, have invented new and useful Improvements in Handles, of which the following is a specification.

The milk receiving can, in ordinary suction milking devices, has a bail handle on whose sides there are arranged hooks for supporting the teat cups which have flexible hose connections with the can so that the device can be conveyed when desired. The hooks have disadvantages, among which may be cited the liability of the entanglement of a cow's tail thereon should the cow switch her tail and also the liability of the tearing of the clothes of the operator. Also the liability of doing bodily injury to the operator and also to the cow.

It may therefore be considered the object of this invention to provide the bail or handle of a milk receiving can for milking devices provided with means which do not project beyond the sides of the bail or handle for effectively supporting the teat cups thereon.

A further object is to produce a bail or handle for milk receiving cans of milking apparatus that has its rounded corners and angle sides provided with key-hole slots, and wherein the teat cup or the flexible hose to which it is connected has attached thereto a headed element or button designed to be received in the key-hole slots for supporting the teat from the handle.

A further object is to provide a handle for milk receiving cans of milking apparatus with key-hole slots to receive buttons attached to teat cups and which slots are so arranged that the buttons may be readily inserted therein or withdrawn therefrom.

The drawing which accompanies and forms part of this application, illustrates a satisfactory embodiment of my improvement.

In the drawing:—

Figure 1 is a view of a sufficient portion of a milk receiving can for a milking apparatus having a bail or handle supporting thereon milk cups in accordance with this invention.

Figure 2 is an approximately central vertical sectional view through one side of the bail or handle, taken centrally through the key-hole slot therein to illustrate the manner in which the headed stud or button on the teat cup may be received in or removed from the slot.

Figure 3 is a side elevation of the bail or handle.

Referring now to the drawing in detail, the numeral 1 designates a portion of a milk receiving can for a suction milking apparatus. The can has pivotally attached to the neck thereof a bail or handle of the usual construction. The handle comprises a straight top 2 having rounded corners 3 which merge into inwardly inclined sides 4, the ends of the sides being provided with straight extensions that receive pivots therethrough. At the juncture of the rounded corners 3 and angle sides 4 of the handle there are bayonet slots. The rounded passages 5 of the bayonet slots enter the rounded corners 3 of the handle, while the restricted and elongated passages 6 enter the angle sides 4 of the handle.

Connected by the usual flexible hose 7 to the sides of the neck portion of the can 1 there are the teat cups 8. The shanks of the teat cups, outward of the portions thereof that enter the hose 7 have attached thereto headed studs or buttons 9. These buttons are designed to be received in the key-hole slots, the heads of the buttons, of course, first passing through the rounded opening 5 of the said slots and the shanks are then directed into the elongated passages 6 of the slots. Because of the location of the rounded portions of the slots in the rounded corners 3 of the handle, the buttons may be inserted therethrough at a right angle with respect to the angle sides 4 of the handle. This materially facilitates the arrangement of the buttons in the slots and their withdrawal therefrom, as it will be apparent that a direct upward pull on the buttons will draw the same both through the longitudinal passages and through the rounded openings provided by the said slots.

It is thought that the foregoing description, when taken in connection with the drawing will fully set forth the construction and advantages of the improvement to those skilled in the art to which such inventions relates.

Having described the invention, I claim:—

1. The combination with a milk receiving can of a milking apparatus provided with a handle whose sides are inclined inwardly and have downwardly directed keyhole slots therethrough, and teat cups having buttons to be received in the keyhole slots for supporting the teat cups on the handle.

2. The combination with a milk receiving can of a milking apparatus provided with a handle having keyhole slots in the sides thereof, and hose suspended teat cups having buttons to be received in the keyhole slots of the handle to support the cups therefrom.

3. A milk receiving can of a milking apparatus having a handle provided with keyhole slots, and hose suspended teat cups, and buttons carried by the hose adapted to be received in the keyhole slots of the handle for removably supporting the cups therefrom.

4. A handle for the milk receiving can of a milking apparatus having keyhole slots therethrough, and teat cups having a button associated therewith to be received in said keyhole slots for supporting the cups from the handle.

In testimony whereof I affix my signature.

WILLIAM H. SMITH.